Nov. 25, 1969 W. C. MERZ ET AL 3,480,480
RAPID ACTIVATING BATTERY
Filed Aug. 31, 1964
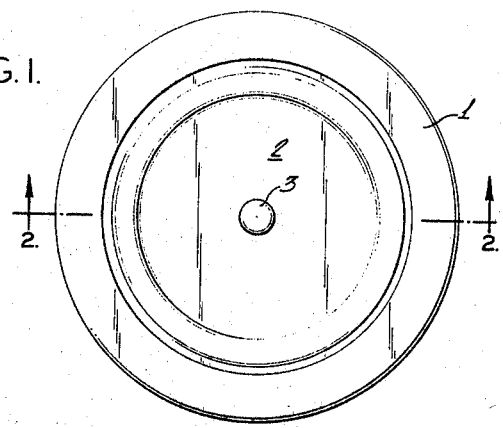
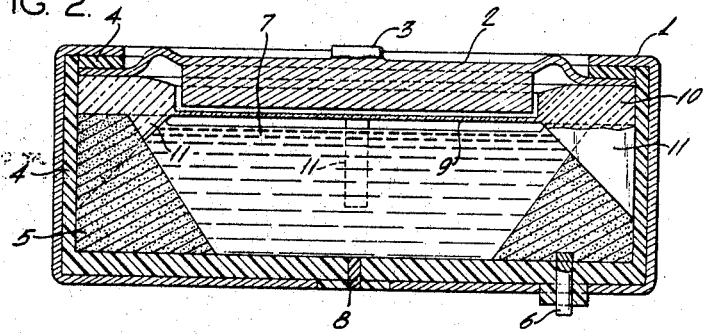
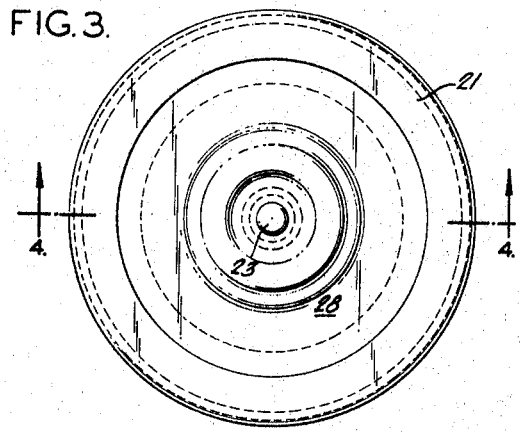
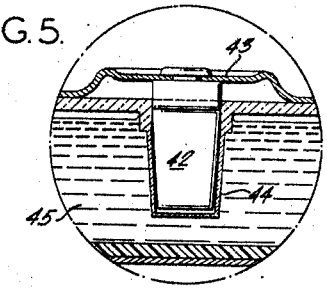
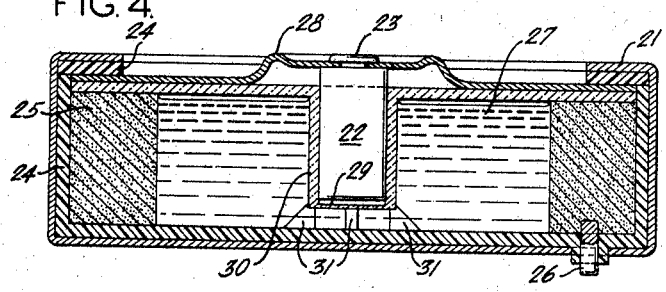
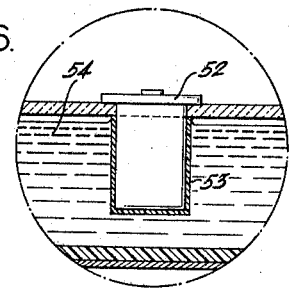
INVENTORS:
WILLIAM C. MERZ
DONALD W. KLOPP
BY Howson & Howson
ATTYS.

United States Patent Office 3,480,480
Patented Nov. 25, 1969

3,480,480
RAPID ACTIVATING BATTERY
William C. Merz, Aldan, and Donald W. Klopp, North Wales, Pa., assignors, by mesne assignments, to Honeywell Inc., Minneapolis, Minn., a corporation of Delaware
Filed Aug. 31, 1964, Ser. No. 393,020
Int. Cl. H01m 17/06
U.S. Cl. 136—90
7 Claims The present invention relates to a novel, reserve type electrochemical current-producing cell and to a method of activating a reserve type cell; and, more particularly, the present invention relates to a novel, reserve type electrochemical, current-producing cell capable of delivering 90% of its peak closed circuit voltage under full load in a matter of milliseconds from command. The invention also relates to a novel battery made up of two or more of the novel cells.

Reserve cells are primary cells which are assembled in an inactive state and activated prior to use, and which, since they are designed to meet specific application, usually military, must be capable of delivering 90% of their peak closed circuit voltage under full load and throughout substantially the entire temperature range of about −65 to 165° F. in a matter of a second or two after command. Such cells are often referred to as "one-shot" cells. Prior to the present invention the important reserve type cells could be classified into three groups: (1) liquid activated, (2) gas activated, and (3) heat activated.

Liquid activated cells require the addition of the electrolyte or electrolyte solvent to the otherwise complete cell. Gas activated cells require the addition of a gas. Each of these types of cells possess limitations because of the method of activation. Hence, each requires a separate reservoir for the activating fluid, either as part of the cell system or detached, and such a reservoir occupies valuable space and adds weight. Such a reservoir may comprise 50% of the total package weight and volume. Moreover, in batteries made up of a multiplicity of cells, the common solvent-electrolyte path leads to inter-cell leakage unless elaborate precautions are taken which add to the weight and volume of the package. In missiles and projectiles, the aim is to provide the highest possible energy output with the least possible weight and volume of cell system. Moreover, liquid and gas activated cells do not activate as rapidly as in desired in many instances because of the time required for the activating fluid to flow into and throughout the cell and to "wet" or contact the constituents.

It is the principal object of the present invention to provide a novel reserve type electrochemical electric current-producing cell, which, while capable of delivering 90% of its peak closed circuit voltage throughout substantially the entire temperature range of between about −65 to 165° F., in common with prior reserve cells, does so in less than 10 milliseconds after command.

It is another principal object of the present invention to provide a reserve type cell having the characteristics referred to in the preceding object and which requires no extraneous reservoir for activating fluid.

A further object is to provide a method for rapidly activating a reserve type cell capable of delivering 90% of its peak closed circuit voltage throughout the entire temperature range of between about −65° to 165° F.

Other objects will become apparent from a consideration of the following specification and the claims.

The novel cell of the present invention comprises, in a reserve type electrochemical current-producing cell, involving an anode, cathode and liquid electrolyte, capable of delivering 90% of its peak closed circuit voltage under full load throughout the entire temperature range of between about −65° to 165° F. in less than about 2 seconds from command, the improvement wherein said electrolyte and said cathode are in their operating position with respect to each other with the cathode material in intimate wetting contact with the liquid electrolyte and wherein said anode is also essentially in operating position but is isolated from said liquid electrolyte by an electrolyte-impermeable barrier which is adapted to be broken substantially instantaneously upon being subjected to stress in excess of its strength, the relationship of said anode, said barrier and said electrolyte being such that destruction of said barrier establishes substantially instantaneous contact of said anode with said electrolyte without substantial movement of said electrolyte away from said cathode and without substantial movement of said anode into said electrolyte. The contact of the cathode material with the liquid electrolyte provides a pre-primed cell needing only anode contact with the liquid electrolyte to activate the cell, and time delay of activation due to cathode wetting time is eliminated.

The invention will be more readily understood from a consideration of the drawings in which:

FIGURE 1 is a plan view, of a typical cell of the present invention.

FIGURE 2 is a side elevational view, enlarged and in section, of the cell of FIGURE 1 as seen along line 2—2;

FIGURE 3 is a plan view of another typical cell of the present invention;

FIGURE 4 is a side elevational view, enlarged and in section, of the cell of FIGURE 3 as seen along line 4—4;

FIGURE 5 is a side elevational view, enlarged and in section, of a further embodiment of the present invention for providing a destroyable barrier between the anode and the electrolyte; and FIGURE 6 is a side elevational view, enlarged and in section, of still another embodiment for providing a destroyable barrier between the anode and the electrolyte.

It will be seen from the foregoing that the present cell is not fluid activated as in the case of prior gas or liquid activated cells, although activation is accomplished by contact between fluid electrolyte and the anode. However, the electrolyte is already in its operable position in the cell in intimate contact with the cathode and no significant flow of electrolyte is required to establish contact with the anode. Since the fluid electrolyte is already in its operating position prior to activation, resulting in a primed cell, no extraneous reservoir is needed for electrolyte or electrolyte solvent. In fact, since very little relative movement need be involved, the volume occupied by the cell system (or package) prior to activation need be no greater than that after activation. The only additional weight, over and above that of the essential cell elements, required by the cell system of the present invention is from the barrier and this is inconsequential as a practical matter. With the cell system of the present invention inter-cell leakage in multi-cell units (batteries) experienced with fluid activated batteries, is eliminated and each cell can be packaged separately and series-wired externally. Of importance is the fact that the present cell can be activated remotely, as by virtue of high G forces experienced upon acceleration (linear or rotational), deceleration (impact), or detonation. The barrier can be designed to be destroyed upon being subjected to such a force of a pre-selected magnitude.

The cell system to which the present invention is applicable, is as stated, of the reserve type which is capable of delivering 90% of its peak closed circuit voltage under full load throughout substantially the entire temperature range of between about −65° to 165° F. Such cell systems, when liquid activated in accordance with previous unpreprimed practice, deliver the stated voltage in less than 2 seconds from command, that is from the initiation of the mechanism which results directly in the introduction of the electrolyte or electrolyte solvent into operating contact with the cell elements including cathode and anode. Many such cell systems are well known. For example, cells where the electrolyte solvent is liquid ammonia are disclosed in United States Letters Patent Nos. 2,863,933; 2,937,219; 2,992,289; 2,996,562 and 3,083,252 and in copending applications Serial Nos. 253,308, now Patent No. 3,239,384 and 317,303, now Patent No. 3,235,408. The cell systems of these patents may be activated by the introduction of liquid ammonia as by adding liquid ammonia as such or by adding ammonia in the vapor state which then condenses to liquid form in situ in the cell. These are however electrolyte or solvent activated and not anode activated as in the present invention also clearly differs from the Leclanché type known in the art can be used.

As will be readily apparent from the following description of embodiments of the invention, the present invention also clearly differs from the Leclanché type of cell which is a so-called dry cell type not useable over the temperature ranges of the present invention; not adapted for remote activation; and not susceptible of extremely rapid activation.

The primary distinction between the cell of the presetn invention and those of the prior art is that, with the present cell all the elements required for an operable reserve cell are in place in the cell compartment including the liquid electrolyte in operating contact with the cathode material, but the anode is physically isolated from, that is out of direct contact with, the fluid electrolyte by virtue of the stated barrier. This barrier is adapted to be destroyed as a barrier in response to stress exceeding the strength of the material from which the barrier is made. The function of the barrier is two-fold: (1) to prevent any contact between the anode and the electrolyte prior to activation, and (2) to permit substantially instantaneous contact between the anode and the fluid electrolyte upon its destruction in response to a predetermined stress. Destruction of the barrier as used herein means elimination as a barrier as by cutting, puncturing, breaking, rupturing, fragmentation, and the like and not the destruction of the matter from which the barrier is made.

From the foregoing it will be seen that destruction of the barrier can be accomplished by various means, the particular means selected being only a secondary consideration as far as the broader aspects of the invention are concerned, although preferred means will be described hereinbelow. For example, a thin wall of tempered glass will break into many small fragments upon the application of a force greater than its tensile strength. Frangible resins will also shatter under similar conditions. Hence, the barrier may be fabricated from such material. A resilient plastic can be cut, punctured or torn upon the application of a force greater than its tensile strength, and the barrier may be fabricated from such a material. A film coating barrier of an elastomer applied to the anode can be made to peel or flow away from the anode surface upon being subjected to high G forces, and a barrier of this type may be employed. It will be apparent that the material from which the barrier is made must be impermeable to and inert toward the electrolyte, so that the anode is physically and chemically separated from the fluid electrolyte.

Referring then to the drawings, FIGURES 1 and 2 may be considered together since like numerals refer to like elements of the structure. Numeral 1 is the cell casing which may be made of steel or other suitable material. In the structure shown, anode 2 serves as the top closure of the cell casing, although it will be realized that the anode may be enclosed. A lug 3 may be provided to which appropriate lead wire or other electrical connection may be attached. Anode 2 is insulated from casing 1 as by a non-conductive plastic 4, such as polyethylene. Numeral 5 represents cathode material also insulated from casing 1 by non-conductive material 4. A conducting lug 6 leading from cathode material 5 and insulated from casing 1 is provided for making electrical connection. Fluid electrolyte 7 may be admitted to the cell through plugged port 8. Membrane-like barrier 9, separating anode 2 from electrolyte 7, is held by annular ring 10 supported as by legs 11. Barrier 9 may be of the same material as annular ring 10 merely being a thinned down area. As shown, the area of barrier 9 is substantially coextensive with that of the bottom face of anode 2. The space between anode 2 and barrier 9 has been exaggerated for purposes of illustration and it will be realized that, when the cetll is at rest and in the inactive condition, anode 2 may actually contact barrier 9. The cathode mass is of depolarizer material such that substantially each and every particle is in intimate wetting contact with fluid electrolyte thereby eliminating cathode wetting delay upon actuation of the cell. While the construction or form of the cathode may vary, for illustrative purposes only, there is shown in the drawings a form consisting of a particulate nature or a permeable structure whereby each particle is completely saturated or in complete contact with the fluid electrolyte to give better and faster activation and output.

Activation of the cell shown in FIGURES 1 and 2, after the cell has been connected electrically into the circuit it is to energize upon activation, is accomplished by subjecting barrier 9 to a predetermined stress exceeding its strength. Such stress may be provided by G forces encountered during rapid acceleration from rest. For example, in a missile or projectile, forces of many thousands of G's are reached in a matter of a few milliseconds from rest. Similar stress can be provided by centrifugal forces when the cell is part of a spinning structure. Barrier 9 can be fabricated to break upon reaching such force of a predetermined magnitude. Such stress may also be provided by rapid deceleration, as upon a missile entering the atmosphere or upon impact with another object. The G forces may be operable directly on barrier 9 causing it to shatter if of a frangible nature, such as the tempered glass or frangible resin referred to above. Stress on barrier 9 caused by anode 2 being pressed against it, by the application of such G forces or other external force downwardly on anode 2, may also be relied upon in whole or in part to destroy barrier 9. On the other hand stress independent of G forces or pressure from anode 2 may be set up in barrier 9 as by thermal shock, piezoelectric effects, or others. At any rate destruction of barrier 9 as a barrier upon being subjected to a predetermined stress provides substantially instantaneous contact between anode 2 and electrolyte 7 and, hence, substantially instantaneous activation of the preprimed cell.

In FIGURES 3 and 4, is shown an embodiment wherein the barrier may be broken in response to shearing forces applied by the anode. Cell casing 21, non-conductive insulation 24, cathode material 25, connecting lug 26 and fluid electrolyte 27 may be similar to those like elements described in connection with FIGURES 1 and 2. Anode 22, provided with contact lug 23, is supported by resilient member 28 and held in cylindrical sleeve member 30 of insulating material. Barrier 29 may be simply a thinned down portion of the material from which sleeve 30 is made or may be a different material. The sleeve and barrier assembly may be supported as by legs 31 to leave a space, filled with electrolyte 27, between barriers 29 and the bottom insulation wall of the cell. In accordance with this embodiment, activation is accomplished by the application of a force downwardly through anode 22. The resulting pressure exerted by the bottom of anode 22 against barrier 29 shears barrier 29 away from sleeve 30 and establishes substantially instantaneous contact between anode 22 and electrolyte 27 with simultaneous activation of the preprimed cell.

In FIGURE 5 is shown a further means of destroying the barrier between anode and fluid electrolyte. Anode 42, supported as by resilient member 43, is wedge-shaped and fits into a similarly shaped barrier member 44 of frangible material. Force exerted downwardly on anode 42 produces forces outwardly normal to the walls of member 44 until the tensile strength thereof is exceeded. Shattering of barrier member 44 provides substantially instantaneous contact between anode 42 and electrolyte 45 with simultaneous activation of the preprimed cell.

FIGURE 6 illustrates still another means of destroying the barrier between the anode and electrolyte. In this embodiment, anode 52 is rigidly mounted so as to protrude into the body of fluid electrolyte 54. Anode 52 is provided with a barrier coating 53 of plastic capable of flowing under high G forces. Subjection of such coated anode to such high G forces in a downward direction as viewed in the drawing causes the barrier coating to flow or peel downwardly thus exposing anode 52 to electrolyte 54.

Modification is possible in the selection of anode material, cathode material, electrolyte and solvent, as well as barrier material and design of the cell utilizing the same in accordance with the present invention without departing from the scope of the invention.

What is claimed is:

1. A compact, rapid activating, reserve electrochemical current producing cell, comprising:
    a housing;
    a rupturable, electrolyte-impermeable barrier dividing said housing into first and second compartments;
    a cathode mounted in a fixed position in said first compartment;
    an anode mounted in relatively fixed and operating position with respect to the cathode and the electrolyte but isolated from a liquid electrolyte by said electrolyte impermeable rupturable barrier in said second comparment;
    liquid electrolyte in said first compartment, said electrolyte and said cathode are in their operating positions with respect to each other with the electrolyte in a preprimed wetting contact with said cathode; and
    means for destroying the rupturable barrier, whereby a substantially instantaneous contact is established between said electrolyte and said anode, to thereby fully activate the cell, said cell being so constructed that said electrodes are mounted in substantially the same position relative to each other prior and subsequent to breaking of said rupturable barrier.

2. A cell as claimed in claim 1, said cathode being comprised of finely divided particles and substantially each thereof being in wetting contact with said fluid electrolyte.

3. A cell as claimed in claim 2, wherein said cathode is a mass of highly permeable particulate depolarizer material such that each particle is in intimate wetting contact with the fluid electrolyte thereby eliminating cathode wetting delay.

4. A cell as claimed in claim 1 wherein said rupturable barrier is made of a frangible material.

5. A cell as claimed in claim 7 wherein said anode is supported by a resilient member and is wedge-shaped to fit into a similarly shaped cup-like barrier member so that upon application of predetermined force to the cell, forces are produced outwardly normal to the walls of the cup-like member thereby to shatter the wall.

6. A cell as claimed in claim 7 including a shell depending from and detachably secured to the rupturable barrier and covering said anode whereby said predetermined force causes said shell to flow or peel downwardly thus exposing the anode to the electrolyte.

7. Apparatus according to claim 1, wherein said rupturable barrier has a central section of reduced cross-section providing a membrane-like barrier substantially coextensive with the bottom face of the anode, said anode being movably mounted in said casing and adapted for displacement in response to a predetermined force on said cell, to rupture said barrier to thereby establish substantially instantaneous contact between said anode and the electrolyte to fully activate the cell.

References Cited

UNITED STATES PATENTS

| | | | |
|---|---|---|---|
| 3,228,801 | 1/1966 | Snyder | 136—90 XR |
| 2,862,038 | 11/1958 | Blary | 136—90 |
| 3,257,243 | 6/1966 | Wild | 136—113 |

ALLEN B. CURTIS, Primary Examiner

A. SKAPARS, Assistant Examiner

U.S. Cl. X.R.

136—113